(12) United States Patent
Kechriotis

(10) Patent No.: US 6,505,224 B1
(45) Date of Patent: Jan. 7, 2003

(54) SYSTEM AND COMPUTER-IMPLEMENTED METHOD FOR PERFORMING MULTI-STAGE FAST WALSH TRANSFORM

(75) Inventor: George Kechriotis, Arlington, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/408,463

(22) Filed: Sep. 29, 1999

(51) Int. Cl.[7] .............................................. G06F 17/14
(52) U.S. Cl. ..................................................... 708/410
(58) Field of Search .......................... 708/410; 382/281

(56) References Cited

U.S. PATENT DOCUMENTS

| | | | |
|---|---|---|---|
| 3,956,619 A | * 5/1976 | Mundy et al. ............... | 708/410 |
| 5,357,454 A | * 10/1994 | Dent ........................... | 708/410 |
| 5,574,675 A | 11/1996 | Lin ............................. | 708/410 |
| 5,644,523 A | 7/1997 | Lin ............................. | 708/410 |
| 5,768,434 A | 6/1998 | Ran ............................ | 382/240 |
| 6,226,318 B1 | 5/2001 | Citta et al. .................. | 375/149 |

* cited by examiner

*Primary Examiner*—David H. Malzahn
(74) *Attorney, Agent, or Firm*—B. Noël Kivlin

(57) ABSTRACT

A system for generating a Walsh transform output vector from an "N"-component input vector includes a vector store, a plurality of Walsh transform kernels and a control module. The vector store is configured to store the input vector The Walsh transform kernels are configured to generate a Walsh transform of a predetermined radix, with at least two of the Walsh transform kernels generating respective Walsh transforms of different radices A and B, B<A. The control module is configured to determine a factorization $N=A^a B^b$, and, in each of "a" stages associated with the radix-A Walsh transform kernel, and "b" stages associated with the radix-B Walsh transform kernel, determine a stride value for the stage, and in each of several iterations, use the stride value to select from the vector store ones of the vector components to be processed during the iteration, use the one of the radix-A or radix-B Walsh transform kernel associated with the stage in connection with the selected vector components, and store the result in the vector store.

21 Claims, 2 Drawing Sheets

SYSTEM AND COMPUTER-IMPLEMENTED METHOD FOR PERFORMING MULTI-STAGE FAST WALSH TRANSFORM

FIELD OF THE INVENTION

The invention relates generally to the field of systems and computer-implemented methods for generating transforms of vectors, and more specifically to systems and computer-implemented methods for efficiently generating Walsh transforms.

BACKGROUND OF THE INVENTION

The Walsh transform is used in a number of areas such as image processing, communications and the like as a fast way to generate an approximation to the fast Fourier transform ("FFT"). Recently, the Walsh transform has also been used in cryptography and in testing the randomness of sequences of pseudo-random numbers, for which it is often necessary to generate the Walsh transform of large data sets, sometimes on the order of a billion or more data items. Accordingly, it is desirable to be able to generate a Walsh transform as efficiently as possible.

Generally, the Walsh transform of a data set f(x) containing "N" data items is defined as:

$$W(u) = \frac{1}{N} \sum_{x=0}^{N-1} f(x) \prod_{i=0}^{n-1} -1^{b_i(x)b_{n-i-1}(u)}, \quad (1)$$

where $b_i(x)$ gives the $i^{th}$ bit of "x." The Walsh transform can be generated for data sets for which "N" is a power of two. The usual practice is to view the data set as a vector comprising N elements, and to generate the transform using N/2 radix-two butterflies organized in $Log_2(N)$ stages, with each radix-2 butterfly being a pair of add- and subtract operations, as follows:

(1) temp1=f($i_1$)+f($i_2$)
(2) temp2=f($i_1$)−f($i_2$)
(3) W($i_1$)=temp1
(4) W($i_2$)=temp2 where, at any stage, f($i_1$) and f($i_2$) are $i_1$-th and $i_2$-th components of the input vector or output of the previous stage, and W($i_1$) and W($i_2$) are the $i_1$-th and $i_2$-th components of the output of the current stage. Thus, in a computer in which the processor is constructed according to the "load-store" architecture, each butterfly requires two loads from memory (retrieving f($i_1$) and f($i_2$) for use in lines (1) and (2)), two arithmetic operations (the addition and subtraction operations in lines (1) and (2)) and two memory storage operations (lines (3) and (4)), or six operations in total. Since there are N/2 butterflies in each stage, the total number of operations per stage is 3N. Further, since there are $Log_2N$ stages, to generate a Walsh transform for a vector of length "N" components using radix-two butterflies, the processor would need to perform 3N $Log_2N$ operations. On a computer system capable of performing one memory access operation concurrently with an arithmetic operation during each processing cycle, during processing of each butterfly, two memory load operations can be performed in parallel with two arithmetic operations, and therefore the total number of processing a cycles required to perform a radix-two Walsh transform is 2N $Log_2N$ It will be appreciated that, in a computer the processor can over-write the input vector with the output Walsh transform vector in memory, thereby reducing the amount of storage space required for the Walsh transform operation.

The number of operations required to be performed to generate a Walsh transform can be reduced significantly if higher-radix butterflies are used. If, for example, a radix-4 butterfly (1) $x_1$=f($i_1$)+f($i_2$)
(2) $x_2$=f($i_1$)−f($i_2$)
(3) $x_3$=f($i_3$)+f($i_4$)
(4) $x_4$=f($i_3$)−f($i_4$)
(5) $y_4$=$x_1$+$x_3$
(6) $y_2$=$x_1$−$x_3$
(7) $y_3$=$x_2$+$x_4$
(8) $y_4$=$x_2$−$x_4$
(9) W($i_3$)=$y_1$
(10) W($i_2$)=$Y_2$
(11) W($i_3$)=$Y_3$
(12) W($i_4$)=$y_4$ is used, the Walsh transform would be generated using $Log_4N$ stages, with each stage containing N/4 butterflies. In that case, each butterfly would require eight memory accesses (that is, load and store operations, reflected in lines (1) through (4) and (9) through (12)) and eight arithmetic operations (reflected in lines (1) through (8)), requiring 4N Log4N (which corresponds to 2N $Log_2N$) operations for all of the butterflies to generate the entire transform. On a computer system capable of performing one memory operation concurrently with an arithmetic operation, the total number of processing cycles required to perform the radix-four Walsh transform is 2N $Log_4N$.

Similarly, if a radix-8 butterfly (1) $x_1$=f($i_1$)+f($i_2$)
(2) $x_2$=f($i_1$)−f($i_2$)
(3) $x_3$=f($i_3$)+f($i_4$)
(4) $x_4$=f($i_3$)−f($i_4$)
(5) $x_5$=f($i_5$)+f($i_6$)
(6) $x_6$=f($i_5$)−f($i_6$)
(7) $x_7$=f($i_7$)+f($i_8$)
(8) $x_8$=f($i_7$)−f($i_8$)
(9) $y_1$=$x_1$+$x_3$
(10) $y_2$=$x_1$−$X_3$
(11) $y_3$=$x_5$+$x_7$
(12) $y_4$=$x_5$−$x_7$
(13) $y_5$=$x_2$+$x_4$
(14) $y_6$=$x_2$−$x_4$
(15) $y_7$=$x_6$+$x_8$
(16) $y_8$=$x_6$−$x_8$
(17) W($i_1$)=$y_1$+$y_3$
(18) W($i_2$)=$y_5$+$y_7$
(19) W($i_3$)=$y_2$+$y_4$
(20) W($i_4$)=$y_2$+$y_5$
(21) W($i_5$)=$y_1$−$y_3$
(22) W($i_6$)=$y_5$−$y_7$
(23) W($i_7$)=$y_2$−$y_4$
(24) W($i_8$)=$y_6$−$y_8$ is used, the number of operations is ($Log_8N$)(N/8)(24 arithmetic operations+16 memory accesses), or 5N $Log_8N$ operations. Similarly to the case with a radix-four butterfly, as described above, on a computer system capable of performing one memory access concurrently with an arithmetic operation the total number of processing cycles required to perform the radix-eight Walsh transform is 3N Log$_8$N. This corresponds to the number of processing cycles required for the radix-four Walsh transform, but in the radix-eight Walsh transform the difference in time between the time the data are loaded and the time they are used in processing is larger than in the case of the radix-four Walsh transform, and so the radix-eight Walsh transform can generally be implemented more efficiently.

Generally, use of higher-radix butterflies can further reduce the number of operations required to be performed to generate a Walsh transform. In addition, depending on the architecture and internal resources of the particular processor, such as the number of registers and the size of its cache, typically the processor will be able to reduce the number of operations for higher-radix butterflies. It will be appreciated, however, that beyond a radix, the number of results that would need to be stored internally (generally, the $y_n$ values in the descriptions above) in order to take advantage of the reduced number of operations would be greater than the internal resources available. When that occurs, those results would need to be stored externally of the processor, resulting in a leveling off of the advantage that might come from higher-radix butterflies.

SUMMARY OF THE INVENTION

The invention provides a new and improved system and computer-implemented method for efficiently generating Walsh transforms of input vectors.

In brief summary, the invention provides a system for generating a Walsh transform output vector from an "N"-component input vector includes a vector store, a plurality of Walsh transform kernels and a control module. The vector store is configured to store the input vector The Walsh transform kernels are configured to generate a Walsh transform of a predetermined radix, with at least two of the Walsh transform kernels generating respective Walsh transforms of different radices A and B, B<A. The control module is configured to determine a factorization N=$A^a B^b$, and, in each of "a" stages associated with the radix-A Walsh transform kernel, and "b" stages associated with the radix-B Walsh transform kernel, determine a stride value for the stage, and in each of several iterations, use the stride value to select from the vector store ones of the vector components to be processed during the iteration, use the one of the radix-A or radix-B Walsh transform kernel associated with the stage in connection with the selected vector components, and store the result in the vector store.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
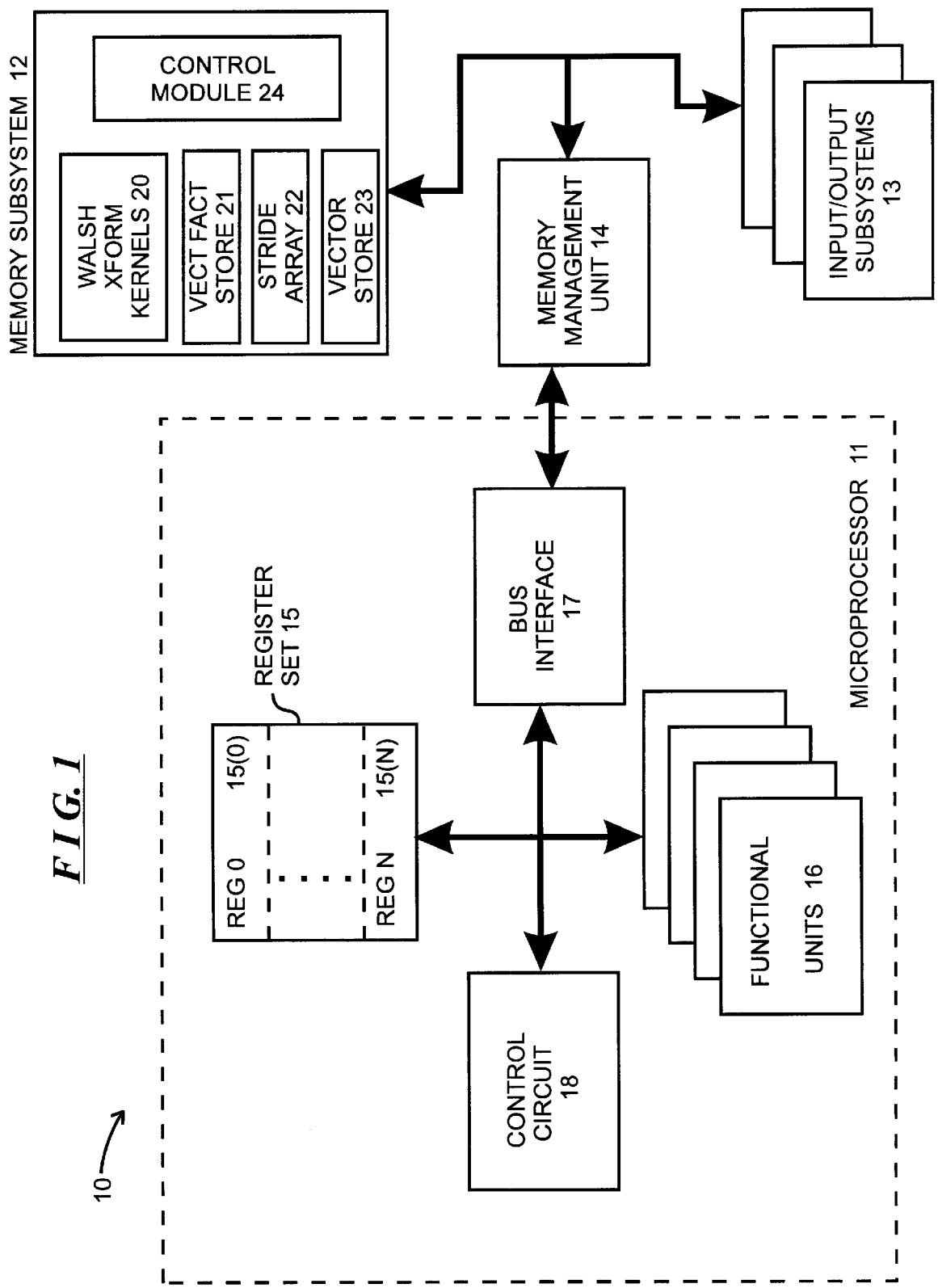
FIG. 1 is a functional block diagram of a system for efficiently performing a Walsh transform operation.

FIG. 1 is a functional block diagram of a system 10 for efficiently performing a Walsh transform operation. With reference to FIG. 1, the system 10 includes a microprocessor 11 which communicates with a memory subsystem 12 and one or more input/output subsystems generally identified by reference numeral 13 through a memory management unit 14. The microprocessor 11 processes programs, including an operating system and one or more application programs all of which comprise instructions, in accordance with data, with the instructions and data (which collectively will be referred to herein as "information") being stored in the memory subsystem 12. Typically, the microprocessor 11 will retrieve instructions and data from the memory subsystem 12 for processing, and will store processed data in the memory subsystem 12. The memory subsystem 12 includes a number of addressable storage locations in which information to be processed by the microprocessor 11 may be stored, and in which the microprocessor 11 may store the processed data.

The system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the system 10. In particular, the operator input subsystems may include, for example, keyboard and mice devices, which an operator may use to interactively input information to the system 10 for processing. In addition, the operator input subsystems may provide mechanisms whereby the operator may control the system 10. The operator output subsystems may include devices such as video display devices, through which the system 10, under control of the microprocessor 11, displays results of processing to the operator. In addition, a printer may be provided to provide a hardcopy output for the operator.

The network ports may enable the system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

In one embodiment, a microprocessor 11 useful in system 10 comprises a microprocessor constructed in accordance with the SPARC Version 9 architecture described in the SPARC Architecture Manual, Version 9. The microprocessor 11 generally includes a number of elements, including a register set 15, one or more functional units 16, a bus interface 17 and a control circuit 18. Generally, under control of the control circuit 18, the bus interface 17, cooperating with the memory management unit 14, retrieves instructions and data from the memory subsystem 12 or data storage elements maintained by particular input/output subsystems 13 for processing and loads the retrieved data into registers in the register set 15. Also under control of the control circuit 18, the functional units 16 perform logical, integer and floating point arithmetic, and other processing operations in connection with data which the control circuit 18 enables to be transferred thereto from the register set 15, to generate processed data which will be transferred to the register set 15 for storage. The control circuit 18 may also enable the bus interface 17, also cooperating with the memory management unit 14, to transfer processed data from the register set 15 to the memory subsystem 12 or data storage elements maintained by particular input/output subsystems 13 for storage.

The control circuit 18 controls the processing operations as performed by the microprocessor 11 in response to the instructions, as described above. The instructions control the loading of data retrieved from the memory subsystem 12 in the register set 15, the operations performed by the functional units 16 and the storage of data from the register set 15 in the memory subsystem 12. The register set 15 includes a plurality of registers 15(0) through 15(N) (generally identified by reference numeral 15(n)) each of which can store data received from the memory subsystem 12 and/or input/output subsystems 13. To initiate processing of data stored in the memory subsystem 12 or an input/output subsystem 13, the control circuit 18

(1) in a "load" operation, enables the bus interface 17 and memory management unit 14 to transfer the data to one or more registers 15(n) in register set 15 as a "destination" register;

(2) in a "processing" operation(i) enables data from one or more of the registers 15(n), as "source" registers, to be transferred to a functional unit 16 for processing, (ii) controls the functional unit 16 to perform a selected processing operation, and (iii) enables the processed data from the function unit 16 to be stored in a selected "destination" register 15(n); and (3) in a "store" operation, enables the bus interface 17 and memory management unit 14 to transfer processed data from one or more selected register(s) 15(n), as "source" registers, to the memory subsystem 12 or an input/output subsystem 13 for storage.

As noted above, system 10 efficiently generates a Walsh transforms of an input vector. In connection with that, the system further includes a plurality of Walsh transform kernels, generally identified by reference numeral 20, of predetermined radices, a vector factorization array 21, a stride array 22, a vector store 23 and a control module 24. In one embodiment, the system makes use of three Walsh transform kernels, of radices two, four and eight, but it will be appreciated that kernels of higher radices may be used. Each kernel 20 includes program code that controls the processor 11 in performing a Walsh transform of the corresponding radix, as described above. In particular, each kernel 20 enables the processor to retrieve portions of an input vector from memory 12 during a load operation, generate the Walsh transform of the input vector preferably using register and cache resources available to the processor as intermediate storage during the Walsh transform generation operation, and store the Walsh transform as an output vector in the same locations in memory as the input vector, thereby overwriting the input vector. It will be appreciated that, in such a system, the maximum size of the input vector, that is the maximum number of components that the input vector can have, that can be accommodated by a kernel 20 corresponds to the radix of the kernel. Thus, the radix-two kernel can be used with an input vector having two components, the radix-four kernel can have an input vector having four components, and the radix-eight kernel can have an input vector having eight components. Each kernel also generates a Walsh transform vector having a like number of components; thus, the radix-two kernel generates an output vector having two components, the radix-four kernel generates an output vector having four components, and the radix-eight kernel generates an output vector having eight components.

The system 10 can use the respective radix-two, radix-four and radix-eight kernel to directly generate a Walsh transform of two-, four- and eight-components input vectors. To accommodate input vectors having larger numbers of components, the system 10 applies the kernels to portions of the input vector in each of a series of stages. Thus, if, for example, the input vector has sixteen components, the system 10 would first use the radix-eight kernel twice to process the input vector to generate a sixteen-component intermediate result. The radix-two kernel would then be used eight times to process the intermediate result to generate the sixteen-component Walsh transform. Similarly, if the input vector has thirty-two components, the system 10 would first use the radix-eight kernel four times to process the input vector to generate a thirty-two-component intermediate result. The radix-four kernel would then be eight times to process the intermediate result to generate the thirty-two-component Walsh transform. On the other hand, if the input vector has sixty-four elements, the system 10 would first use the radix-eight kernel eight times to process the input vector to generate a sixty-four-component intermediate result. The radix-eight kernel would then be used again eight times to process the intermediate result to generate the sixty-four-component Walsh transform. Thus, for input vectors of up to sixty-four elements, the kernels are applied in two stages, including a first stage to generate the intermediate result from the input vector, and a second stage to process the intermediate result to generate the Walsh transform.

For input vectors having more than sixty-four elements, the system makes use of the kernels in more stages. Thus, if, for example, the input vector has 128 components, the system 10 would first use the radix-eight kernel sixteen times to process the input vector to generate a 128-component first intermediate result. The radix-eight kernel would again be used sixteen times to process the intermediate result to generate a 128-element second intermediate result. Finally, the radix-two kernel would be used sixty-four times to generate the 128-component Walsh transform. Thus, for an input vector of 128 elements, the system would generate the Walsh transform in three stages, including two stages to generate the first and second intermediate results, and a third to generate the Walsh transform from the second intermediate result. In general, to determine the number of stages, the particular radix kernel to be used in each stage, the system 10 factors the number "N," identifying the number of elements in the input vector. That is, the system determines, for equation $N=(8^a)(4^b)(2^c)$, values for "a," "b" and "c" which will initially maximize the value of "a" and then maximize the value of "b". The value of "a" identifies the number of stages in which the radix-eight kernel is to be used, the value of "b" identifies the number of stages in which the radix-four kernel is to be used, and the value of "c" identifies the number of stages in which the radix-two kernel is to be used.

For each stage, the system 10 also determines the particular ones of the element of the input vector (for the first stage) or the intermediate result vector (for successive stages) that are to be used for each kernel processed in the respective stage. In that operation, for each stage the system 10 considers the input vector, or a respective intermediate result vector, as a three-dimensional array indexed by the triple [s,r,n], where "s" is a stride value, "r" is a radix value and "n" indicates the number of times the kernel is used in the respective stage. The stride value indicates, for each kernel in the stage, the displacement from one element to the next element in the respective vector that is to be used to define successive elements for the respective kernel. Thus, if the input vector has, for example, sixty-four elements $e_0, \ldots, e_{63}$, necessitating use of the radix-eight kernel eight times in each of two stages, in the first stage the radix-eight kernel would use elements $e_0, e_8, e_{16}, \ldots e_{56}$ as successive input elements, and would store the successive elements of the intermediate result vector in the storage locations from which those elements were retrieved. Similarly, the radix-eight kernel would use the elements $e_1, e_9, e_{17}, \ldots e_{57}$ as successive input elements, and would store the successive elements of the intermediate result vector generated therefrom in the storage locations from which those elements were retrieved. Generally, the stride "s" for the first stage is initialized to "N," the number of elements in the input vector, divided by "r," the radix of the kernel used in the stage, the radix "r" corresponds to the radix for the stage and the value of "n" is initialized to "one." Thus, in this stage, the sixty-four element vector is viewed as an eight-by-eight-by-one array $$\begin{matrix} e_0 & \cdots & e_{56} \\ \vdots & \ddots & \vdots \\ e_7 & \cdots & e_{63} \end{matrix}$$

whose rows indicate the successive inputs for each of the respective times the radix-eight kernel is executed for the stage.

For the second stage, the sixty-four element intermediate vector is viewed as a one-by-eight-by-eight array in which the stride "s" dimension corresponds to the "s" dimension of the previous stage divided by the radix of the current stage, and "n" corresponds to "n" of the previous stage (in this case "one") multiplied by the radix of the current stage. In that case, the vector would be viewed as an array $$\begin{matrix} e_0 & \cdots & e_7 \\ \vdots & \ddots & \vdots \\ e_{57} & \cdots & e_{63} \end{matrix}$$

in which again the rows indicate the successive inputs for each of the respective times the radix-eight kernel is executed for the stage.

Thus, in general, the three dimensional [s,r,n] array is initially considered as an array [s,r,1], and for successive stages the. In any case, the rows of the array indexed by the radix dimension define the successive elements used in connection with each processing operation using the respective kernel.

With reference again to FIG. 1, as noted above, the system 10 includes the vector factorization array 21, the stride array 22, the vector store 23 and the control module 24. The vector store 23 initially stores the input vector, and is also used to store the intermediate vector(s) and Walsh transform vector. The vector factorization array is used to store the successive factors of "N," the number of elements comprising the input vector, and is used to determine the radices of the kernels used in the successive stages. The stride array identifies the dimensions [s,r,n] for the vector in vector store 23 in determining the strides for the successive stages. Finally, the control module 24 controls the system 10 in connection with execution of the Walsh transform. The kernels 20 and control module 24 essentially comprise program code used by the processor 11 in connection with generation of the Walsh transform. The vector store 23 comprises storage locations in memory 12 for storing the input vector, the intermediate result vector(s) and the Walsh transform vector. Similarly, the vector factorization array 21 and stride array 22 comprise storage locations in memory 12 for storing the factorization of "N" for identifying the radices of the kernels used in the successive stages and the stride triple used in determining the stride for the kernels used in successive stages.

Figure 2:
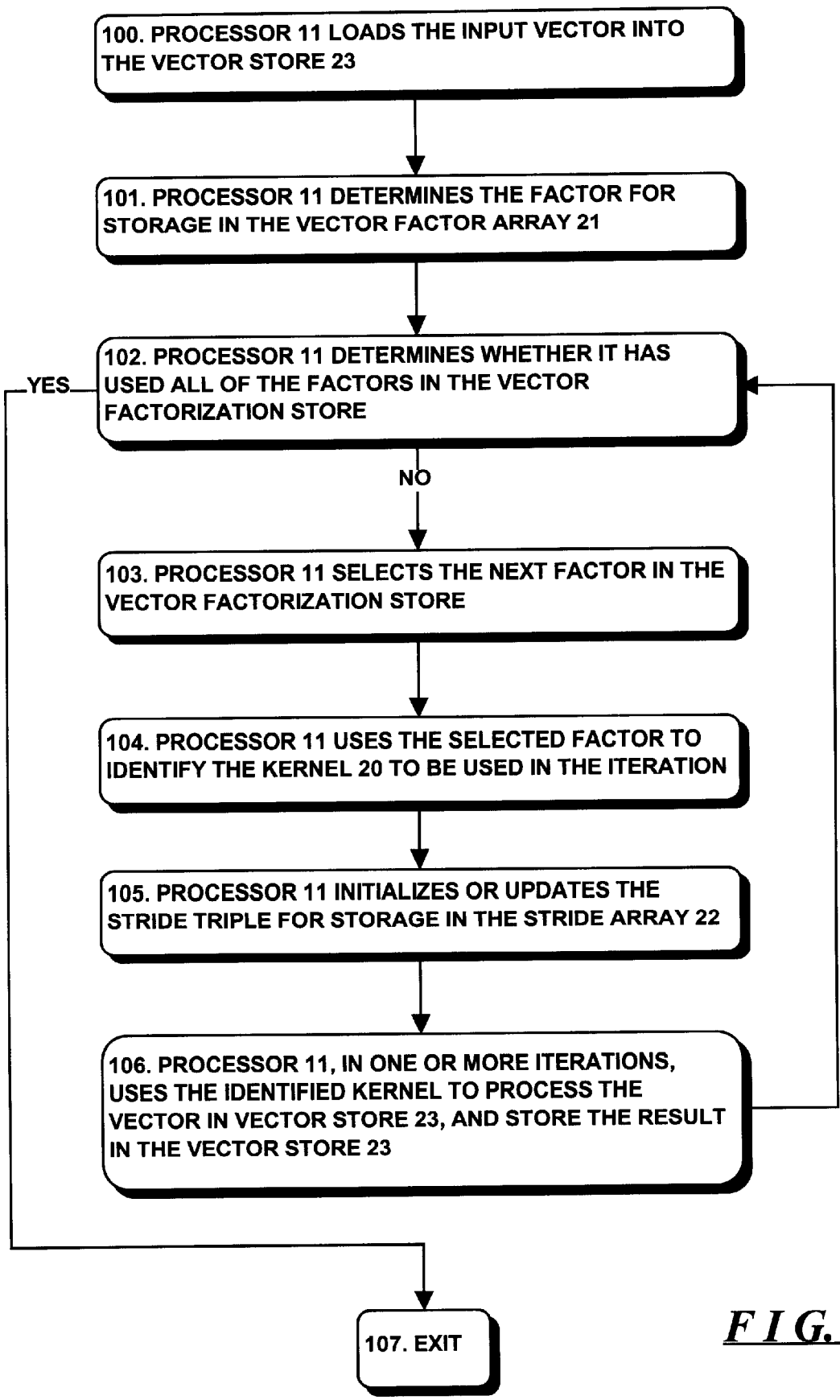
FIG. 2 is a flowchart depicting operations performed by the system depicted in FIG. 1.

With this background, operations performed by the system 10 in generating the Walsh transform will be described in connection with the flowchart depicted in FIG. 2. With reference to FIG. 2, the processor 11, under control of the control module 24, initially loads the input vector into the vector store 23 (step 100) and determines the factorization for storage in the vector factorization array 21 (step 101). In step 101, the control module 24 enables the processor to first determine whether "N," the number of elements in the input vector is divisible by eight. If the processor determines that "N" is divisible by eight, it loads an "8" into the vector factorization array, and repeats the operation with N/8. While the processor determines through a series of iterations that eight evenly divided the quotient of the previous iteration, it will continue to load "8" into the vector factorization array. When the processor determines that the quotient from the previous iteration is not evenly divisible by eight, it will perform similar operations with four and two. The successive values in the vector factorization array 21 correspond to the radices of the kernels to be used in the successive stages.

Following step 101, the processor, under control of the control module 24, generates the Walsh transform of the input vector stored in vector store 23 in a series of iterations. Initially, the processor determines whether it has used all of the factors in the vector factorization store (step 102) and if not, selects the next factorization in the vector factorization store (step 103). It will be appreciated that, in the first iteration, the processor will select the first factorization in the vector factorization store 21, and in successive iterations (if any) it will select successive factors (also, if any). The processor then will use the selected factorization to identify the kernel 20 to be used in the iteration (step 104) and to initialize or update the stride triple for storage in the stride array 22 (step 105). Thereafter, the processor, in one or more iterations, uses the identified kernel to process the vector in vector store 23, and store the result, which may be an intermediate result vector or the Walsh transform in the vector store 23 (step 106). Following step 106, the processor returns to step 102.

The processor performs operations described above in connection with steps 102 through 106 through one or more iterations, using successive factors stored in vector factorization store 21, until it determines in step 102 that it has used all of the factors in the vector factorization store 21. When the processor determines that it has used all of the factors in the vector factorization store, the vector in the vector store 23 is the Walsh transform of the input vector, and it can exit (step 107).

The invention provides a number of advantages. In particular, the invention provides an arrangement for efficiently generating a Walsh transform of an input vector, using kernels of various radices which may be mixed during a Walsh transform operation.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A system for generating a Walsh transform output vector from an "N"-component input vector, comprising:

A. a vector store configured to store said input vector;

B. a plurality of Walsh transform kernels each configured to generate a Walsh transform of a predetermined radix, at least two of said Walsh transform kernels generating respective Walsh transforms of different radices A and B, B<A;

C. a control module configured to determine a factorization $N=A^a B^b$, and, in each of "a" stages associated with the radix-A Walsh transform kernel, and "b" stages associated with said radix-B Walsh transform kernel,
  i. determine a stride value for the stage, and
  ii. in each of a plurality of iterations, use the stride value to select from the vector store ones of the vector components to be processed during the iteration, use the one of the radix-A or radix-B Walsh transform kernel associated with the stage in connection with the selected vector components, and store the result in the vector store.

2. A system as defined in claim 1 in which one of said Walsh transform kernels is a radix-two Walsh transform kernel.

3. A system as defined in claim 1 in which one of said Walsh transform kernels is a radix-four Walsh transform kernel.

4. A system as defined in claim 1 in which one of said Walsh transform kernels is a radix-eight Walsh transform kernel.

5. A system as defined in claim 1 in which the control module is configured to determine the factorization so as to maximize the value of "a."

6. A system as defined in claim 1 in which the control module is configured to generate the stride value as a triple [s,r,n], where "s" is a stride value, "r" is a radix value identifying the radix of the Walsh transform kernel used in the stage, and "n" indicates the number of times the kernel is used in the respective stage, the triple defining a three-dimensional representation for the components of the vector stored in the vector store, the control module using ones of the components of the vector along one of said dimensions of the three-dimensional representation in each of said iterations.

7. A system as defined in claim 6 in which said control module is configured to initially generate said triple where the stride value s=N/r and "n" corresponds to "one."

8. A system as defined in claim 7 in which said control module is configured to, in each stage after the first, the stride value "s" corresponds to the value of "s" used in the previous stage divided by the radix of the kernel used in the next stage, the radix value "r" corresponds to the value of the radix used in next stage, and the value "n" corresponds to the value of "n" used in the previous stage multiplied by the radix used in the previous stage.

9. A computer implemented method of generating a Walsh transform output vector comprising the enabling a computer to perform the steps of:
   A. determining from a value "N" corresponding to the number of components of a vector, a factorization $N=A^aB^b$, B<A, and,
   B. in each of "a" stages associated with a radix-A Walsh transform kernel, and "b" stages associated with a radix-B Walsh transform kernel,
      i. determining a stride value for the stage, and
      ii. in each of a plurality of iterations, using the stride value to select from a vector store ones of the vector components to be processed during the iteration, using the one of the radix-A or radix-B Walsh transform kernel associated with the stage in connection with the selected vector components, and storing the result in the vector store.

10. A method as defined in claim 9 in which the factorization is determined so as to maximize the value of "a."

11. A method as defined in claim 9 in which the stride value is generated as a triple [s,r,n], where "s" is a stride value, "r" is a radix value identifying the radix of the Walsh transform kernel used in the stage, and "n" indicates the number of times the kernel is used in the respective stage, the triple defining a three-dimensional representation for the components of the vector stored in the vector store, the control module using ones of the components of the vector along one of said dimensions of the three-dimensional representation in each of said iterations.

12. A method as defined in claim 11 in which said triple is initially generated so that the stride value s=N/r and "n" corresponds to "one."

13. A method as defined in claim 12 in which in each stage after the first, the stride value "s" corresponds to the value of "s" used in the previous stage divided by the radix of the kernel used in the next stage, the radix value "r" corresponds to the value of the radix used in next stage, and the value "n" corresponds to the value of "n" used in the previous stage multiplied by the radix used in the previous stage.

14. A computer program product for enabling a computer to generate a Walsh transform output vector from an N-component input vector, the computer program product including a computer readable medium having encoded thereon:
   B. a plurality of Walsh transform kernels each configured to enable said computer to generate the Walsh transform of a predetermined radix, at least two of said Walsh transform kernels generating respective Walsh transforms of different radices A and B, B<A;
   C. a control module configured to enable said computer to determine a factorization $N=A^aB^b$, and, in each of "a" stages associated with the radix-A Walsh transform kernel, and "b" stages associated with said radix-B Walsh transform kernel,
      i. determine a stride value for the stage, and
      ii. in each of a plurality of iterations, use the stride value to select from the vector store ones of the vector components to be processed during the iteration, use the one of the radix-A or radix-B Walsh transform kernel associated with the stage in connection with the selected vector components, and store the result in the vector store.

15. A computer program product as defined in claim 14 in which one of said Walsh transform kernels is a radix-two Walsh transform kernel.

16. A computer program product as defined in claim 14 in which one of said Walsh transform kernels is a radix-four Walsh transform kernel.

17. A computer program product as defined in claim 14 in which one of said Walsh transform kernels is a radix-eight Walsh transform kernel.

18. A computer program product as defined in claim 14 in which the control module is configured to enable said computer to determine the factorization so as to maximize the value of "a."

19. A computer program product as defined in claim 14 in which the control module is configured to enable said computer to generate the stride value as triple [s,r,n], where "s" is a stride value, "r" is a radix value identifying the radix of the Walsh transform kernel used in the stage, and "n" indicates the number of times the kernel is used in the respective stage, the triple defining a three-dimensional representation for the components of the vector stored in the vector store, the control module using ones of the components of the vector along one of said dimensions of the three-dimensional representation in each of said iterations.

20. A computer program product as defined in claim 19 in which said control module is configured to enable said computer to initially generate said triple where the stride value s=N/r and "n" corresponds to "one."

21. A computer program product as defined in claim 20 in which said control module is configured to enable said computer to, in each stage after the first, the stride value "s" corresponds to the value of "s" used in the previous stage divided by the radix of the kernel used in the next stage, the radix value "r" corresponds to the value of the radix used in next stage, and the value "n" corresponds to the value of "n" used in the previous stage multiplied by the radix used in the previous stage.

* * * * *